UNITED STATES PATENT OFFICE.

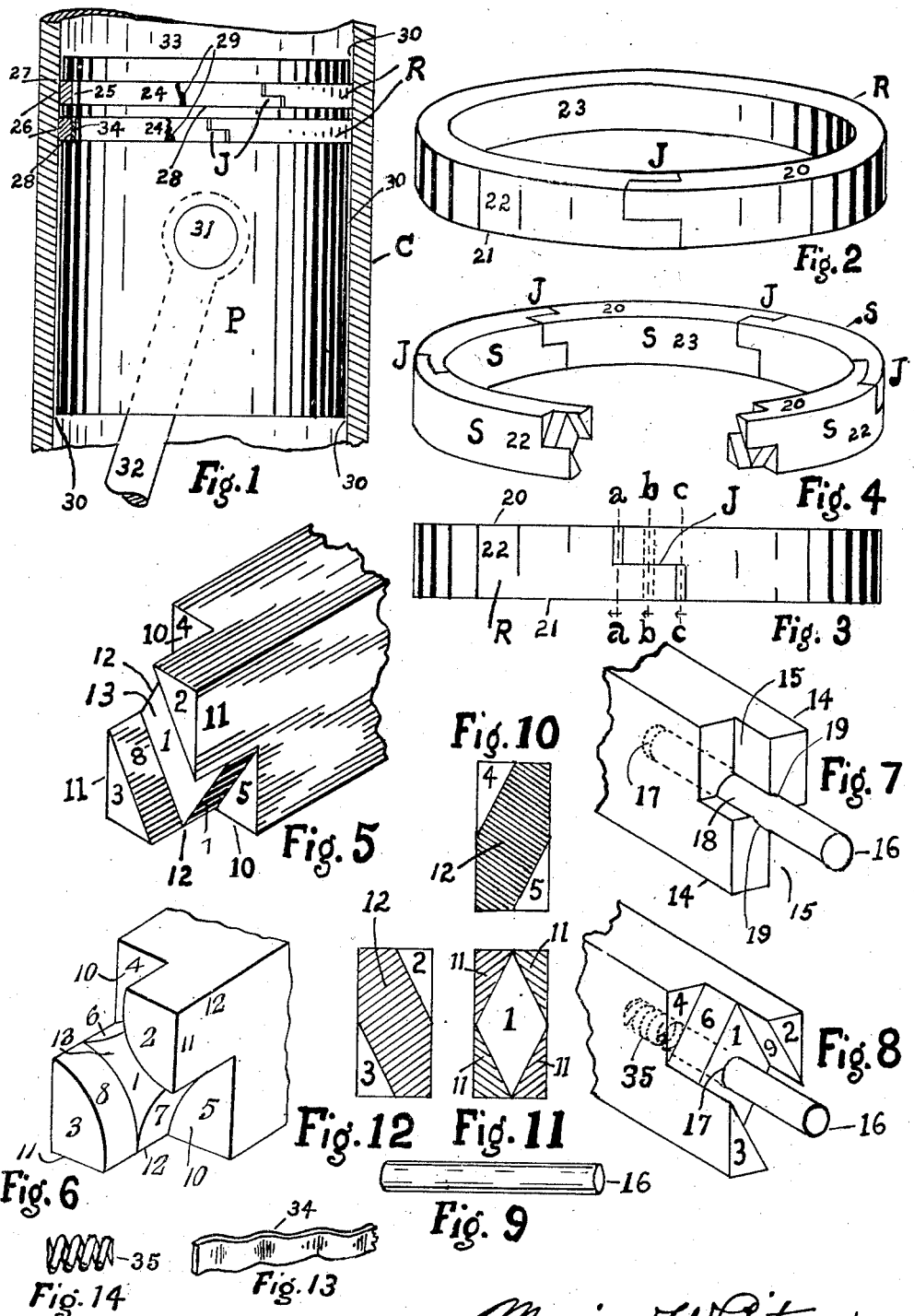

MARION W. PITNER, OF CHICAGO, ILLINOIS.

PACKING ELEMENT.

1,358,243.   Specification of Letters Patent.   Patented Nov. 9, 1920.

Application filed April 13, 1918, Serial No. 228,370. Renewed June 8, 1920. Serial No. 387,512.

*To all whom it may concern:*

Be it known that I, MARION W. PITNER, a citizen of the United States, residing at Chicago, in the county of Cook and State of Illinois, have invented certain new and useful Improvements in Packing Elements, of which the following is a specification.

My invention relates to packing elements such as are used on the pistons, piston-rods and shafts of internal combustion engines, steam engines and pumps but more particularly to the expansion joints of packing elements used as piston rings in internal combustion engines.

Broadly, the object of my invention is to provide a packing element that will maintain a fluid-tight closure between two relatively moving bodies, such as a cylinder and piston or a cylinder-head and piston-rod, under the varying conditions of their use, particularly the conditions hereinafter mentioned.

More specifically, one of the objects of my invention is to provide a packing element, hereinafter referred to as a 'ring', with an overlapping and non-leaking expansion joint whereby said ring can expand and contract, diametrically, to compensate for the wear and disproportionate expansion and contraction of said ring and bodies and whereby said fluid-tight closure will be maintained by having any one or more of the expansible, annular surfaces of said ring in unbroken contact with one of said bodies and any other one or more of said surfaces in unbroken contact with the other body.

Another object of my invention is to provide a resilient, diametrically expansible and contractible ring with a reinforcing expansion joint whereby said ring will tend to exert a more uniform radial tension and pressure upon the inner wall of the cylinder than it would if provided with the ordinary joint. By "diametrically expansible and contractible." I mean, capable of being made larger and smaller in diameter.

Still another object of my invention is to provide a ring with an interlocking and reinforcing expansion joint whereby neither of the joined ends can move, relatively, except in an endwise direction but which can move freely in an endwise or circumferential direction as when expanding and contracting.

A further object of my invention is to provide a resilient, diametrically expansible and contractible ring having a plurality of sections whereby each section is held independently in its proper relative position by the adjacent ends of other sections.

With these and other objects in view, my invention consists in the novel constructions and arrangements of parts hereinafter more fully described, illustrated in the accompanying drawings and pointed out in the appended claims. In this specification I illustrate and describe a form of my invention suitable for use as piston packing in internal combustion engines, from which suitable forms for piston-rod packing and shaft packing will be obvious.

Similar reference characters denote similar parts throughout the accompanying drawings, in which:

Figure 1 is a sectional view of a portion of a cylinder C, connecting-rod 32 and wrist-pin 31, showing the position of the piston and rings relative thereto. The rings are broken away at 29 to show the grooves 24 and the spring 34.

Fig. 2 is a perspective view of my improved ring in a fully closed or contracted condition.

Fig. 3 is a side view of my improved ring in a slightly expanded or normal working condition.

Fig. 4 illustrates a form of my improved ring having a plurality of sections one of which is omitted from the drawing.

Fig. 5 is an enlarged view of an end of my improved ring showing one form of its construction.

Fig. 6 is another enlarged view of the same end showing another form of its construction.

Fig. 7 illustrates a modification of my improved ring provided with a connecting pin 16 and showing how recess 15 communicates with hole 17 at 18.

Fig. 8 illustrates an end of my improved ring provided with a connecting pin and spring.

Fig. 9 illustrates the pin 16 shown in Figs. 7 and 8.

Fig. 10 is a section taken on the line $a$—$a$, of Fig. 3.

Fig. 11 is a section taken on the line $b$—$b$ of Fig. 3.

Fig. 12 is a section taken on the line $c$—$c$ of Fig. 3.

Fig. 13 illustrates the spring 34 shown in Fig. 1.

Fig. 14 illustrates the spring 35 shown in Fig. 8.

As is already well known, a common type of internal combustion engine, to which my invention is applicable, has a cylinder C, a movable piston P therein, annular grooves 24 in the piston, the upper and lower walls of which are in parallel planes, and piston rings R in the grooves.

The cylinder C is generally air or water cooled and is not expanded as much by the heat as the piston P therefore the piston is made slightly smaller in diameter than the bore 33 of the cylinder C and the piston rings R are used to close the slight passage 30 between the cylinder C and the piston P.

A common form of piston ring now in general use is a resilient, annular ring of rectangular transverse section, its peripheral face 22 being approximately as wide as the groove 24 and adapted to conform to and form a fluid-tight relation with the inner surface 33 of the cylinder C and the upper surface 20 and the lower surface 21 of the ring R being adapted to form a substantially fluid-tight relation with the upper and lower walls of the groove 24 in the piston P.

The ring R is split by having a small section of its annular body removed in order to allow it to contract and expand diametrically and it is provided with some form of joint J, generally overlapping to reduce or prevent leakage at the joint.

The original piece or casting from which the ring R is made is somewhat larger in diameter than the cylinder bore 33 and the small section is removed in order to give the ring considerable outward radial tension when placed inside the cylinder C.

Lubricating oil is used on the various bearing surfaces, which are, the bearing 26 between the piston ring and cylinder, the bearings 27 and 28 between the piston ring and piston and the bearings between the overlapping parts of the piston ring.

A common trouble with ordinary piston rings is that some of the lubricating oil is sometimes evaporated or decomposed by the heat whereby a deposit of carbon or other solid matter is formed on or between these bearing surfaces and as the ends of the piston ring are not substantially held against such movement, this solid matter forces one of the ends of the ring upward, downward or radially inward, relative to the other end, thereby destroying the fluid-tight relation between the piston ring R and the cylinder C, or piston P or between the overlapping parts of the ring. Sometimes this is due to sediment or foreign matter in the oil and sometimes it is due to the consistency of the oil being or becoming too great.

Another common trouble with ordinary piston rings, the ends of which are not held against such movement, is that the intense heat sometimes causes one or both of the ends of the ring to twist out of position, the result of which is similarly undesirable.

Still another common trouble with ordinary piston rings, especially those comprising a single piece of metal, is that when they are split to permit of diametrical expansion and contraction, the radial tension of the rings is greatly reduced at this point therefore they do not exert a uniform outward radial tension and pressure around the cylinder wall and the excess pressure at certain points introduces unnecessary wear and friction and a consequent loss of power. Multiple-ring and eccentric piston rings have been made in an effort to overcome this trouble but the multiple-ring piston ring introduced overlapping parts between which deposits of solid matter formed and forced the ring out of position the result of which was leakage and loss of power. The one-piece eccentric ring, being very thin near the joint, introduced bearing surfaces 20 and 21 of varying widths to contact with the piston at 27 and 28 and quickly became worn and loose in the groove 24 and leaked while the thin edges at the ends could not be tightly joined, besides which the eccentric ring left a large space 25 behind the ring in which sediment collected with the same undesirable result, viz., leakage and loss of power.

To construct one form of ring R in accordance with my invention, suitable for use in the type of internal combustion engine already referred to, and adapted to overcome these troubles, I provide a circular piece of suitable, resilient material, such as cast iron or bronze, in the form of an annular ring, or rectangular cross section, approximately 3% larger in diameter and of slightly greater thickness and width than I wish the finished piston ring to be.

I split this circular piece at one point, as with a saw, thus removing a small section of the piece and forming two opposing ends. I then cut away diagonally opposite corners of both ends to an endwise depth of approximately 3% of the circumference of the ring, thus forming the recesses 10 and the surfaces 4, 5, 6 and 7, leaving tongues 12 diagonally across both ends, the opposing tongues 12 being crosswise to each other.

I then cut grooves 13, as wide as the tongue 12 is thick, through the tongues, transversely, and to a depth of approximately half way through the tongues in an endwise direction, thus creating the surfaces 1, 8 and 9 and forming the projections 11, each groove 13 being in the plane of the tongue 12 on the opposite end of the ring and adapted to receive the remaining central portion of that tongue when the ring is diametrically contracted, thus producing a substantial, interlocking, overlapping and non-leaking expansion joint J whereby the ring can contract about 3% and whereby the uniform diametrical resilience of the ring, before it was split, has been largely regained.

Obviously, when this ring is slightly opened, as shown in Fig. 3, the space between the opposing ends will be divided into five sections, viz., a gap in each of the four corners, between the surfaces 2 and 4 and between the surfaces 3 and 5, each gap extending approximately half way across an adjacent side and edge of the ring, and a void in the central portion between surfaces 1.

The surfaces 6, 7, 8 and 9 may be either straight or curved in a transverse direction and either straight or curved in a lengthwise or circumferential direction as shown by Figs. 5 and 6. The surfaces 2, 3, 4 and 5 may be either straight or curved and either in the plane of the axis of the ring and piston or at an angle to it.

I now contract the ring to its working diameter, which is just slightly larger than its smallest possible diameter, and finish its surfaces 20, 21 and 22 to the exact dimensions desired, as by grinding them.

The ring R is now ready for use and may be inserted in a groove 24 of the piston P and contracted therein and the piston P inserted into the cylinder C. The constant tendency of the ring R to resume its original diameter, will cause it to maintain a constant, fluid-tight relation with the surface 33 of the cylinder C, as shown at 26 and as the edges 20 and 21 of the ring have been ground to closely fit the groove 24, the ring will keep the slight passage 30 between the piston P and surface 33 closed, even though the piston P and cylinder C may expand and contract at different rates.

In some instances the ring should have so much outward radial tension that it is desirable to use a spring such as shown in Fig. 13 and at 34 in Fig. 1 where it is shown in the space 25 in the groove 24. In other instances it is more desirable to introduce additional radial tension by the use of a spring such as shown in Fig. 14 and at 35 in Fig. 8.

For some purposes there should be no outward tension of or on the ring R, as when the ring is used for piston-rod or shaft packing, but there should be some inward or contracting tension which can be produced by making the ring R a little smaller than its normal working diameter or by the use of independent springs. In some forms of engines and pumps the pressure of the fluid or gas can be used instead of springs.

The piston ring construction illustrated in Fig. 4 is in accordance with my invention and comprises six sections S and six joints J. Obviously rings can be constructed in accordance with my invention comprising any reasonable number of sections and joints of any preferred form coming within the scope of my invention.

Fig. 8 illustrates a form of my invention in which registering holes 17 are drilled in the surfaces 1, to a desirable depth, and a substantial, slightly resilient connecting pin 16 is inserted in the holes which stiffens the ring at the joint and tends to make the radial tension of the ring more uniform. The connecting pin 16 may be of any preferred form and may or may not be used as desired. The spring 35 may also be of any preferred form and may or may not be used, either with or without the connecting pin, as desired.

Fig. 7 illustrates a modification of my invention in which the registering holes 17 are drilled in the opposing ends and diagonally opposite corners of the ends are cut away, as with a small side mill, approximately half way across an adjacent side and edge of the ring, thus forming the projections 14 and the recesses 15 which are adapted to receive the projections 14 when the ring is contracted. The pin is inserted in the holes as in the former case. It will be observed that in this modification there is a substantial bearing surface 19 between the pin 16 and the projections 14 and that the pin forms part of the sealing surface.

The pin 16 and the overlapping parts of the ends are co-active in producing a more uniform resilience and radial pressure of the ring and in preventing relative lateral movement of the ends. Either the pin or the overlapping parts, separately perform these functions to some extent.

Obviously other changes can be made in the form and arrangement of parts, than those I have shown and described, without departing from the spirit and scope of my invention, therefore I do not wish to limit myself to the exact constructions and arrangements herein set forth.

What I claim as new and desire to secure by Letters Patent, is:

1. A resilient and diametrically contractible and expansible packing element having opposing ends, a tongue diagonally across each end, each tongue being crosswise to the tongue on the opposite end and a groove in each tongue in the plane of the tongue on the opposite end and adapted to receive a portion of said tongue when said element is contracted.

2. A resilient and diametrically contractible and expansible packing element having opposing ends, registering holes in each end, a sealing-pin in said holes and diagonally opposite recesses in each end whereby a tongue comprising two projections and a portion of said sealing-pin is formed diagonally across each end, said tongue being crosswise to the tongue on the opposite end and said recesses being adapted to receive the projections on the opposite end when said element is contracted.

3. A diametrically expansible and contractible packing element having opposing ends, a tongue diagonally across each end, each tongue being crosswise to the tongue on the opposite end, a groove in each tongue in the plane of the tongue on the opposite end and adapted to receive a portion of said tongue when said element is contracted and resilient means for expanding said element.

4. A diametrically expansible and contractible packing element having opposing ends, a tongue diagonally across each end, each tongue being crosswise to the tongue on the opposite end, a groove in each tongue in the plane of the tongue on the opposite end and adapted to receive a portion of said tongue when said element is contracted, registering holes in the bottoms of said grooves, a connecting pin in said holes and resilient means for expanding said element.

In testimony whereof I have subscribed my name.

MARION W. PITNER.